United States Patent [19]
King

[11] 3,771,433
[45] Nov. 13, 1973

[54] FOOD HEATING DEVICE

[75] Inventor: Leonard Tony King, Long Beach, Calif.

[73] Assignee: Speedine Partnership, San Francisco, Calif.

[22] Filed: Jan. 28, 1972

[21] Appl. No.: 221,770

Related U.S. Application Data

[60] Division of Ser. No. 48,209, June 22, 1970, Pat. No. 3,669,003, which is a continuation-in-part of Ser. No. 629,315, April 7, 1967, abandoned.

[30] Foreign Application Priority Data
June 4, 1971 Canada ................................ 114841

[52] U.S. Cl. ..................... 99/331, 99/339, 99/358
[51] Int. Cl. ............................................. A47j 27/62
[58] Field of Search ...................... 99/171, 221, 233, 99/253, 274, 331, 339; 219/383

[56] References Cited
UNITED STATES PATENTS
| | | | |
|---|---|---|---|
| 2,532,014 | 11/1950 | Davis | 99/358 X |
| 2,013,675 | 9/1935 | Steerup | 99/182 |
| 3,573,430 | 4/1971 | Eisler | 99/171 X |
| 2,182,383 | 12/1939 | Lang et al. | 99/358 X |
| 2,474,390 | 6/1944 | Aff | 99/358 X |
| 3,385,952 | 5/1968 | Mix | 99/171 X |
| 3,257,934 | 6/1966 | Korr | 99/358 X |
| 3,210,199 | 10/1965 | Schlaf | 99/358 X |
| 2,844,695 | 7/1958 | McLean | 99/358 X |

Primary Examiner—Billy J. Wilhite
Attorney—Karl A. Limbach et al.

[57] ABSTRACT

This disclosure describes a food heating device for heating and cooking food items such as TV-dinners which are prepackaged in standard electrically conductive containers. The device includes a rigid enclosure having a base and a cover for providing access to the interior of the enclosure to allow insertion or removal of the food package. The food package is supported on the base and, a step-down transformer supplies low voltage electrical power to the conductive food package. First and second clamps are supported by the enclosure means and clampingly engage first and second edge portions of the conductive food package, respectively, so that the electrical current passes direcly through the food package and at least some of the food contained therein to rapidly and efficiently heat the food.

11 Claims, 8 Drawing Figures

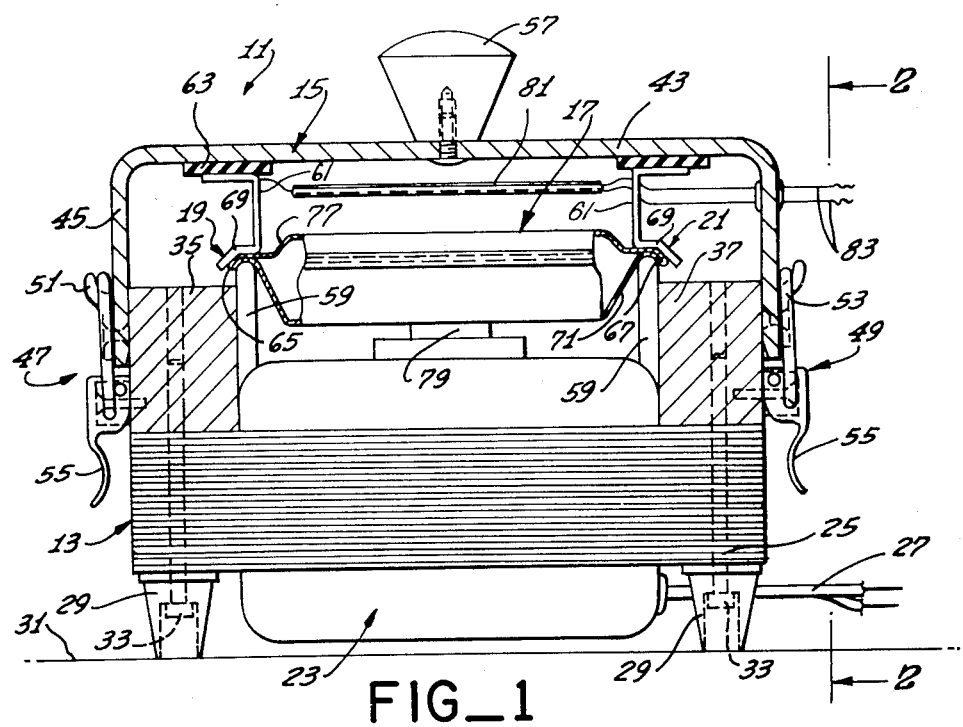
FIG_1
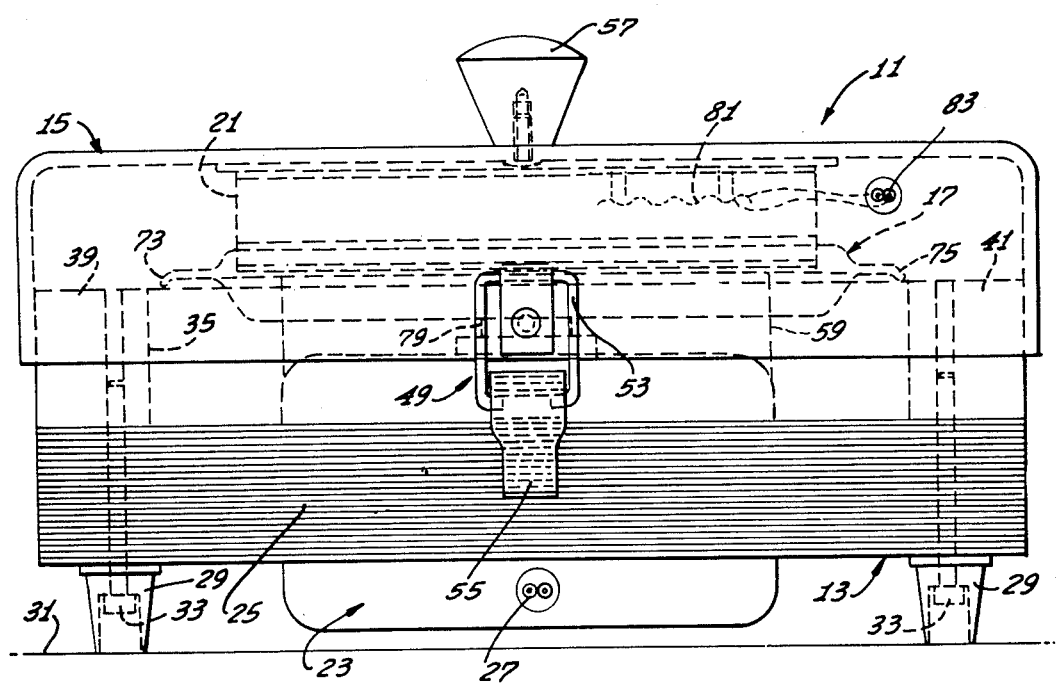
FIG_2

3,771,433
FIG_3
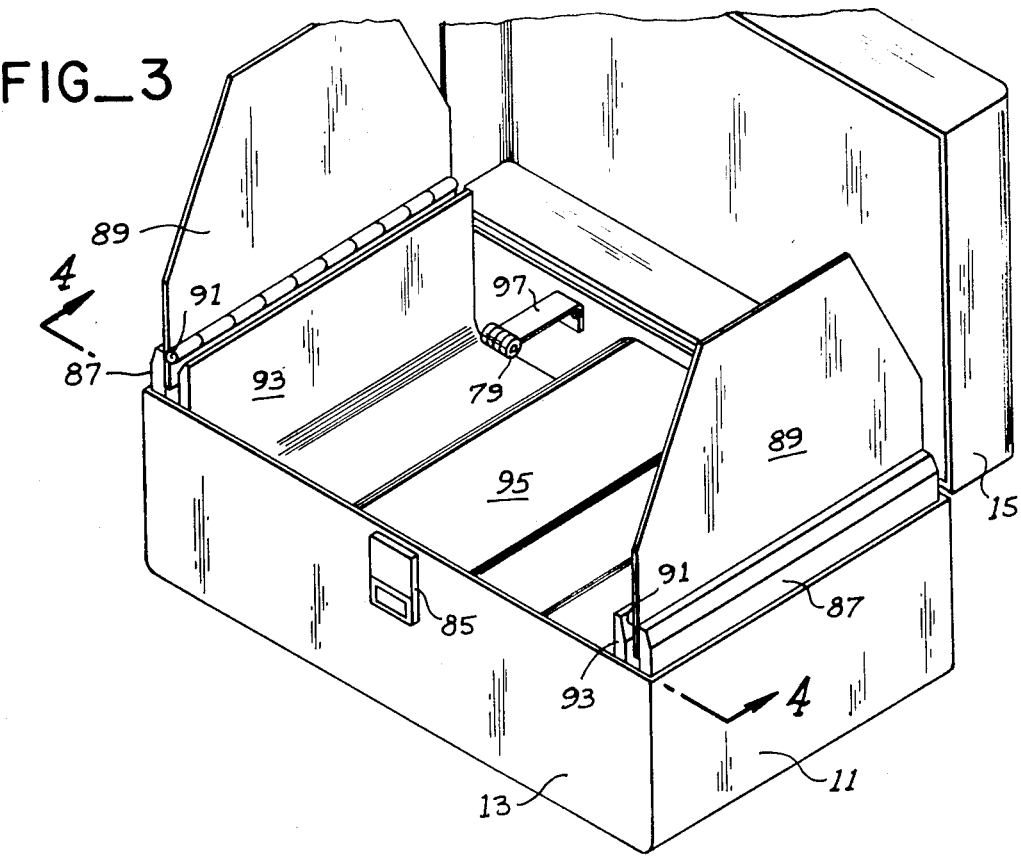
FIG_4
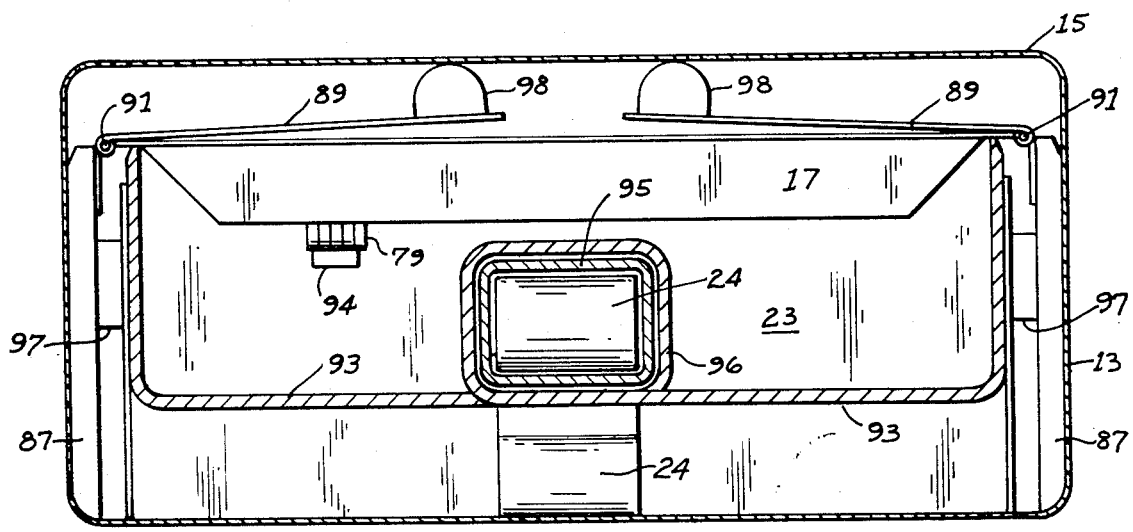

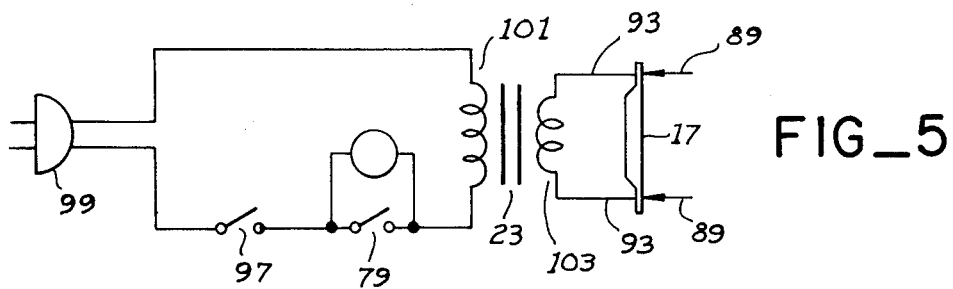
FIG_5
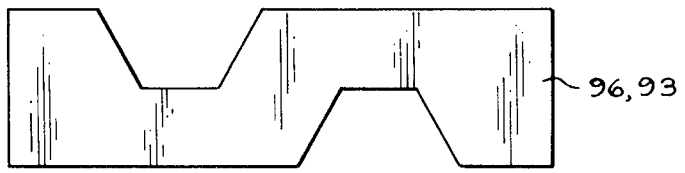
FIG_6
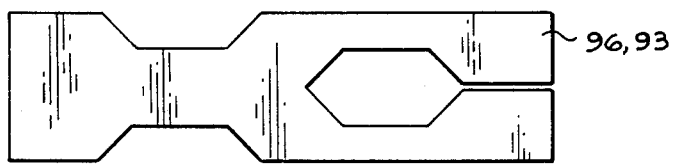
FIG_7
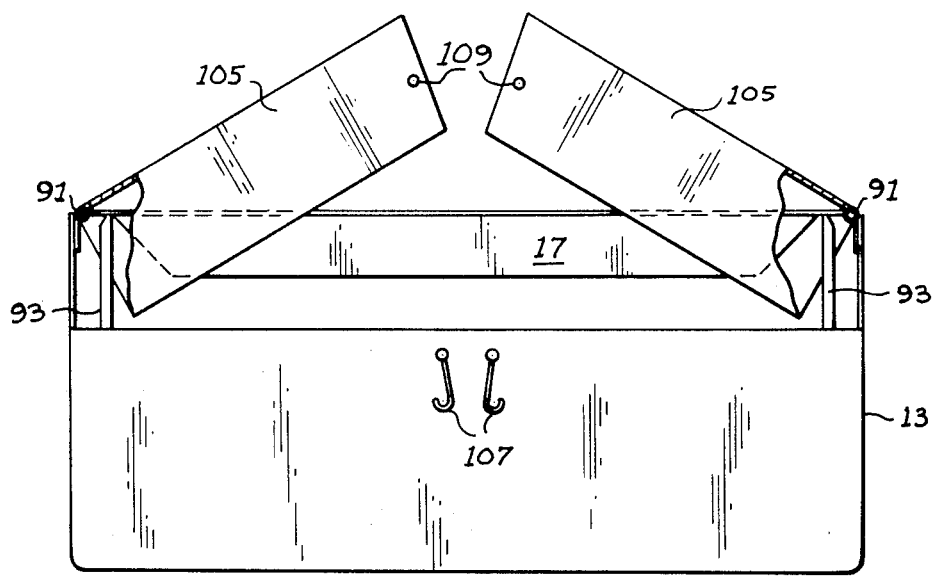
FIG_8

FOOD HEATING DEVICE

This is a division of application Ser. No. 48,209, filed June 22, 1970. Said Ser. No. 48,209 application is a continuation-in-part of copending application Ser. No. 629,315, filed Apr. 7, 1967, now abandoned.

BACKGROUND OF THE INVENTION

Various prepackaged food items of which TV-dinners are exemplary are now sold in containers constructed entirely of a conductive material such as aluminum foil. It is common practice to heat or cook TV-dinners in a conventional oven. As is well known, in conventional ovens gas or electric heating elements heat the walls of the oven and the air within. The heated air in turn heats the food item. This is a slow and inefficient operation and may consume up to 45 minutes of time.

On the other hand, microwave ovens will thoroughly and rapidly heat food items. However, these ovens are very expensive and not feasible on a domestic scale. Moreover, they cannot be used to heat foods held in metallic containers.

Several prior art devices heat packaged food items by passing electrical current directly through a specially constructed food package. This has the advantage of more rapidly heating the food item. However, these prior art heaters require a specially constructed container for the food. Often these containers include several layers of different materials and this significantly increases the cost of the food package. Furthermore, each of these special heaters are substantially restricted in their use to food packages which have been specially designed for use therewith.

Specific examples of prior art devices include U. S. Pat. No. 3,210,199 to S.O. Schlaf wherein a special container for the food is provided. Also U.S. Pat. Nos. 3,230,861 and 3,257,934 to A. L. Korr require the food to be placed in a special container. U.S. Pat. No. 2,182,383 to O. W. Lang et al, provides for heating food during a canning process by passing current through a tin can.

SUMMARY OF THE INVENTION

The present invention overcomes the above noted disadvantages in providing an inexpensive and efficient heating device which rapidly heats prepackaged food items. The heating device of the present invention is particularly adapted for use with the standard disposable prepackaged food packages such as TV-dinners and the like and requires no specially designed container. With the present invention the food is rapidly heated in the standard conductive container in which it was packaged and sold to the consumer.

The present invention accomplishes these advantageous results by passing electrical current directly through the standard conductive container which contains the food. The food is in contact with the conductive container and depending upon the particular characteristics thereof, some current will also pass directly through the food. Thus, substantially all of the energy applied is dissipated as heat in the food producing very rapid and efficient heating without need for a special container for the food.

To further assure rapid and even heating of the food, it is preferred to pass current from one longitudinal edge to the opposed longitudinal edge of the container. Preferably the current is applied along the full length of the opposed longitudinal edges of the container. Many of these standard containers have an aluminum foil conductive top layer or cover so that the current is passed through the package in parallel paths defined by the cover and the body of the container, respectively. This provides heat all around the food item.

With the present invention, prepackaged food items such as a TV-dinner can be fully prepared for eating in from about 90 seconds to 7 minutes. Alternating current at low voltage, for example, 0.6 volts is used. This provides rapid heating of the food package while making the package safe against electrical shocks.

Another advantageous feature of the present invention is that the electrical current is passed directly through at least some of the food within the conductive container. As the temperature of the metal container rises, the resistance thereof will increase; however, as the temperature of the water within or around the food rises, the resistance thereof, decreases. Therefore, as the entire food package is heated, a larger proportion of the current is passed directly through the food to further increase the speed and efficiency of the heating device.

A further advantageous feature of the invention is that resistance and leakage reactance losses are minimized.

The concepts noted above are applicable to food heating and preparation in various environments not only as vending machines but preferably in simple, inexpensive domestic appliances for heating prepackaged food items such as TV-dinners. Such an appliance in one embodiment includes a rigid enclosure for enclosing the food package. The enclosure includes a base on which the conductive container is supported and a removable cover for providing access to the interior of the enclosure. Low voltage alternating current is provided by a step-down transformer which is electrically connectable to standard line voltage. A pair of clamps are mounted on the enclosure for gripping the opposed edge portions of the conductive container to pass the low voltage current therethrough. In an alternative embodiment a hinged cover is provided on the base; the cover when closed hold a pair of hinged clamps against the opposed edge portions of the container. In a further embodiment, a pair of hinged covers also function to clamp the package edges when the cover is closed.

In one preferred form of the domestic appliance, the transformer forms all or a portion of the base. Each of the clamps includes an elongated rigid member or first jaw mounted on the base and extending upwardly therefrom. These upright members are spaced an amount corresponding to the distance between edge portions of the conductive container. The spacing between edge portions may be variable, if desired, to accommodate food packages of different sizes. The removable cover contains a second rigid member which forms the second jaw of the clamp. When the cover is in position to close the enclosure, the two rigid members automatically grip the opposed edge portions of the conductive container. Thus, by merely placing the conductive container in the enclosure, the container automatically engages the upright rigid member which serves as the lower jaw of the clamp and as supporting means for the container. The closing of the cover closes the enclosure and automatically clamps the conductive container in position.

In an alternative preferred embodiment of the domestic applicance, a rectangular parallepiped enclosure is provided with a cover portion hinged along one edge of the enclosure. The step-down transformer is supported centrally in the enclosure and a pair of conductive panels insulated from the enclosure, connected to the transformer secondary, extend outward from the transformer and upward parallel to opposed sides of the enclosure. Support for food packages to be heated is supplied by the upward panel portion. Panels serving as clamps and hinged adjacent to the conductive panels clamp the food package against the conductive panels when the enclosure cover is closed.

In a further preferred embodiment, the hinged clamps also serve as an enclosure cover by a proper choice of dimensions thereby eliminating a separate cover.

A thermostat is preferably mounted to engage or substantially engage the conductive container for automatically opening the circuit to the transformer when the conductive container reaches a predetermined temperature. In addition, a resistive heating element may be provided above the container, if desired to provide additional heat to particular portions of the device.

The invention, both as to its organization and operation together with further features and advantages thereof may best be understood by reference to the following description taken in connection with the accompanying drawing.

BRIEF DESCRIPTION OF THE DRAWINGS

FIG. 1 is an end elevational view partially in section of a heating appliance according to one embodiment of the present invention.

FIG. 2 is a front elevational view of the heating device taken along section line 2—2 of FIG. 1.

FIG. 3 is a perspective view of a heating appliance according to another embodiment of the instant invention.

FIG. 4 is a cross-sectional front elevational view of the heating appliance of FIG. 3.

FIG. 5 is a schematic circuit diagram of a heating appliance according to an embodiment of the invention.

FIG. 6 is a plan view of an unfolded secondary winding.

FIG. 7 is a plan view of an alternative unfolded secondary winding.

FIG. 8 is a front elevational view of a heating appliance according to a further embodiment of the present invention.

DESCRIPTION OF THE PREFERRED EMBODIMENTS

Referring to the drawing, wherein the same reference numerals will be carried throughout the various figures to refer to like or identical parts, reference numeral 11 designates a heating device in the form of an inexpensive appliance constructed in accordance with the teaching of this invention.

Generally, in the embodiment of FIGS. 1 and 2, the heating device 11 includes a base 13 and a removable or openable cover 15 which coacts with the base 13 to form an enclosure for a food package 17. The food package 17 is held within the enclosure by a pair of clamps 19 and 21.

The base 13 is formed primarily by a transformer 23. The transformer 23 has the usual primary and secondary windings and an enlarged core 25 which forms a major portion of the base 13. The transformer 23 is of the step-down type and is connectible to a standard 110 volt AC outlet by a pair of leads 27.

The base 13 also includes four feet 29 constructed of rubber or similar material for supporting the heating device 11 on a suitable supporting surface 31. The feet 29 may be suitably attached to the core 25 by bolts 33. Two elongated block members 35 and 37 are suitably attached to the upper surface of the core and extend longitudinally for almost the full length of the core 25 as shown in FIG. 2. A second pair of block members 39 and 41 (FIG. 2) are secured to the core 25 by the bolts 33 and extend transversely of the heating device 11 along the periphery of the core.

The cover 15 includes a top wall 43 and a peripheral wall 45 depending therefrom and overlapping the block members mounted on the core 25. The cover 15 should be completely removable from the base 13 or at least pivotable to a position in which access to the interior of the enclosure is provided. In the embodiment illustrated the cover 15 is releasably secured to the base 13 by a pair of conventional toggle latches 47 and 49. Each of the toggle latches 47 and 49 includes an upper or fixed latching member 51 rigidly affixed to the peripheral wall 45, a lower or movable latching member 53, and a toggle lever secured to the adjacent block member for operating the movable latching member 53. A handle 57 in the form of a knob is secured to the top wall 53 of the cover 15.

The clamps 19 and 21 are identical and each of these clamps includes an elongated upright rigid member 59 secured to or forming a part of the base 13 and an upper elongated rigid member 61 suitably secured to the top wall 43 but insulated therefrom by an insulator 63.

Each of the upright members 59 extends longitudinally for substantially the full longitudinal length of the food package 17. Each of the upright members 59 is a conductor electrically connected to or forming a part of the secondary of the transformer 23. Preferably, the upright members 59 are secured to the adjacent block members 35 and 37 so that these block members will provide support for the upright member.

As shown in FIG. 1, the food package 17 has opposed conductive longitudinal edge portions 65 and 67. These edge portions rest on the upright members 59 as shown and thus, the upright members 59 form supporting means for the food package 17.

The upper members 61 preferably extend longitudinally for substantially the full longitudinal length of the edge portions 65 and 67 and include jaw portions 69 which cooperate with the upper ends of the associated upright members 59 to securely clamp the edge portions 65 and 67 when the cover 15 is mounted on the base 13 as shown in FIG. 1.

The clamps 19 and 21 are spaced apart a distance to accommodate a TV-dinner of a standard size. This spacing between the clamps 19 and 21 can be varied if desired, to accommodate food packages of different dimensions.

The electrical current is supplied to the food package 17 through the clamps 19 and 21 and it is preferred to provide the clamps along the longitudinal edges of the food package 17. However if desired, the clamps may extend along the transverse edge portions of the food package 17.

The food package 17 is of a standard type and includes a container 71 of conductive material such as aluminum foil. The container 71 has the longitudinal edge portions 65 and 67 and transverse edge portions 73 and 75 (FIG. 2) all of which have substantial length. The container 71 may have a plurality of the usual compartments (not shown) for containing different food items. The container 17 has an upper wall 77 of conductive material such as aluminum foil which completely closes the upper end of the container 71. The container 71 and the upper wall 77 provide two parallel paths for the flow of current between the clamps 19 and 21 to provide heat completely around the food contained within the food package 17. The clamps 19 and 21 should engage generally opposed substantially spaced portions of the food package 17 to assure that the resistance provided by each of the parallel paths will not be grossly disproportionate to obtain reasonably even heating across the top and the bottom of the food package.

A thermostat 79 is mounted on the base 13 in a position in which it is engageable with the lower surface of the container 17. The thermostat 79 is connected to a switch (not shown) and automatically opens such switch when the temperature of the container 71 reaches a predetermined value such as the boiling point of water. Opening of this switch opens the circuit to the transformer. If desired, the thermostat 79 could also be arranged to close that switch if the temperature of the container 71 dropped below a predetermined value.

A resistive heating element 81 is mounted on the cover 15 for providing additional heat to a preselected location of the food package 17. The resistive element 81 may be as large as desired, but usually will be of lesser area in plan than the food package 71 so that preselected areas of the food package 71 can be provided with additional heat such as may be required for browning certain food items contained therein. In the embodiment illustrated, the heating element 81 extends substantially the full transverse width of the food package 17 and less than half of the longitudinal length of the food package. The heating element 81 may be provided with electrical current through separate leads 83 or through the upper member 61 of the clamps 19 and 21 if the member 61 is made of conductive material. A switch (not shown) may be provided to open and close the circuit to the heating element 81 without effecting the current flow to and through the food package 17.

To use the food heating device 11, the cover 15 is removed and the food package 17 is placed on the base 13 with the upright members 59 supporting the longitudinal edge portions 65 and 67. Next, the cover 15 is placed over the base 13 and the toggle latches 47 and 49 are operated to tightly secure the cover to the base. This causes the jaw portion 69 of the clamps 19 and 21 to close tightly against the upper surface of the longitudinal edge portions 65 and 67 of the food package 17. In this position, the clamps 19 and 21 engage the longitudinal edge portions 65 and 67 along substantially the full width thereof and the container 71 and the upper wall 77 thereof provide two parallel paths for the flow of current between two clamps 19 and 21.

By operating an appropriate switch (not shown) the transformer 23 supplies current to the clamps 19 and 21. The transformer 23 may, for example, reduce 110 volt AC line voltage to about 0.6 volts. Current is thus supplied through the container 71 and the food therein to rapidly and efficiently heat the food. As the temperature of the food increases, the water content thereof offers proportionately less resistance to the flow of current and accordingly, the amount of current flowing through the food items themselves is increased. When the food within the food package 17 is thoroughly heated, the thermostat 79 is operative to open the circuit to the food package 17. The time required may be, for example, about six minutes.

If it is desired to utilize the resistive heating element 61, the foil forming the upper wall 77 may be peeled back to expose the food items directly beneath the resistive heating element 81. The resistive heating element 81 is supplied with current simultaneously with the application of current directly to the food package 17 to allow the resistive heating element to brown the exposed portions of the food item therebelow. The food heating device may be sufficiently large to simultaneous heat several TV-dinners, if desired.

In FIGS. 3 and 4 an alternative embodiment of the heating device 11 is shown having a base 13 with a cover 15 hinged along the top rear edge of the base portion. When cover 15 is closed, a rectangular parallelepiped enclosure is formed. Cover 15 is secured in the closed position by a latching member 85. A latching member (not shown) is provided on cover 15 to mate with member 85. A pair of rigid upright supports 87 along the inside transverse sidewalls of base 13 support a pair of clamping plates 89. Plates 89 are attached by hinges 91 and are free to rotate downward until engaged by the upward extending portions of curved panels 93. The top edges of panels 93 are spaced so as to support the transverse edges of a standard conductive food package. Panels 93 are conductive and are an extended portion of the secondary of a transformer 23 located centrally in the base 13. Transformer 23 has a C-shaped core 24, a primary winding 85, and a secondary 96. The secondary may be a single turn winding and may be integral with panel piece 93. Thus for example, secondary 96 and panels 93 could be a single piece formed in an S-shape as shown unfolded in FIG. 6. The central portion of piece 96 would be wrapped around transformer primary 24. A second alternative is shown in FIG. 7, wherein the combination secondary 96 and conductive panel 93 is a modified horseshoe-shaped piece. The left hand portion would be looped around and threaded through the right central operative in order to encircle transformer primary 24. By making the support a portion of the transformer secondary, the voltage drop is kept low and the close proximity of the food container to the transformer reduces leakage reactance loss. In effect the container too becomes a part of the secondary.

Panels 93 are insulated from the base portion 13 by insulating material 97. Clamping panels 89 are formed from electrically non-conductive material. A pair of stops 98 located at the ends of clamps 89 farthest from the hinge points engage the cover 15 when the unit is closed. Thus a food container 17 is placed over conductive end supports 93, clamps 89 are folded down over the container, and cover 15 is closed thereby forcing a tight low-resistance contact between the transverse edges of conductive container 17 and the conductive panels 93 of the transformer secondary. A thermostat 79 is provided on a spring support 94 so as to engage the food package 17 when it is in place.

FIG. 5 shows the electrical connection of the heating appliances. One side of primary 101 of step-down transformer 23 is connected to one pin of line plug 99. The other side of primary 101 is interrupted by a single-pole, single throw on/off switch 97 and a thermostat 79. When the thermostat reaches a predetermined minimum temperature its associated switch opens thus removing the line voltage from primary winding 101. The secondary winding 103 is connected to the edges of a conductive food container 17 via conductors 93 and good electrical contact is maintained by clamps 89.

In FIG. 8 a modification of the heating unit of FIGS. 3 and 4 is depicted having generally the same base and internal structure including conductive support panels 93 connected to the transformer secondary. A food package 17 is shown in place supported along its transverse edges by panels 93. A pair of combination clamping members and top covers 105 are hinged at hinges 91 fixed to the upward extending transverse sidewalls of base 13. Combination members 105 act as clamping panels 89 of FIGS. 3 and 4 to hold package 17 against the conductive panels 93 and in addition function as a top cover for the enclosure. In the closed position a pair of hooks 107 engage pins 109 on the members 105 to hold the members tightly closed.

Although an exemplary embodiment of the invention has been shown and described, many changes, modifications, and substitutions may be made by one having ordinary skill in the art without necessarily departing from the spirit and scope of this invention.

I claim:

1. Apparatus for rapidly heating food in a container completely conductive adjacent the food between first and second generally opposed edge portions comprising rigid enclosure means for substantially enclosing the conductive container, said enclosure means including a base and an openable cover for providing access to the interior of the enclosure means to allow insertion or removal of the conductive container;

a step-down transformer having a primary electrically connectible to standard line voltage for providing at a secondary a low voltage substantially less than 110 volts;

first and second clamping means mounted on and supported by the enclosure means for clampingly engaging the first and second edge portions of the conductive container, respectively;

mechanical advantage latching means forcing said container edge portions and said clamping means into close low resistance engagement;

means for electrically connecting each of said clamping means to the secondary of said step-down transformer to supply current from said transformer through said container to rapidly heat the food; and a resistive heating element mounted in said enclosure means above the conductive container and means to supply said resistive heating element with electrical current whereby said resistive heating element supplies additional heat to a preselected location along the container.

2. The combination of claim 1 wherein the secondary of said transformer forms a portion of said clamping means and directly engages the edge portions of the conductive container.

3. The combination of claim 1 wherein said clamping means provide a narrow line contact with the edge portions of said container.

4. A combination as defined in claim 1 wherein said first clamping means includes a first elongated upstanding rigid member supported by said base for supporting the container along the first edge portion thereof, at least a portion of said member being electrically conductive and engaging the first edge portion of the conductive container along a substantial length thereof, and means for retaining said first edge portion on said first member.

5. A combination as defined in claim 1 including thermostat means responsive to the temperature of the conductive container rising to a predetermined value for automatically halting the flow of current from said transformer to said first and second clamping means.

6. A combination as defined in claim 1 wherein said transformer forms at least a portion of said base.

7. The combination of claim 1 wherein said container is supported in closely spaced relationship to said transformer to minimize transformer leakage reactance losses and resistance losses in said secondary.

8. Apparatus for rapidly heating food in a container completely conductive adjacent the food between first and second generally opposed edge portions comprising a step-down transformer having a primary electrically connectible to standard line voltage for providing at a secondary a low voltage substantially less than 110 volts;

first and second clamping means for clampingly engaging the first and second edge portions of the conductive container, respectively, wherein the secondary of said transformer forms a portion of said clamping means and directly engages the edge portions of the conductive container, mechanical advantage latching means forcing said container edge portions and said clamping means into close low resistance engagement;

means for electrically connecting each of said clamping means to the secondary of said step-down transformer to supply current from said transformer through said container to rapidly heat the food; and a resistive heating element mounted in said enclosure means above the conductive container and means to supply said resistive heating element with electrical current whereby said resistive heating element supplies additional heat to a preselected location along the container.

9. The combination of claim 8 wherein said clamping means provide a narrow line contact with the edge portions of said container.

10. A combination as defined in claim 8 including thermostat means responsive to the temperature of the conductive container rising to a predetermined value for automatically halting the flow of current from said transformer to said first and second clamping means.

11. The combination of claim 8 wherein said container is supported in closely spaced relationship to said transformer to minimize transformer leakage reactance losses and resistance losses in said secondary.

* * * * *